United States Patent
Daris et al.

[11] Patent Number: 5,915,724
[45] Date of Patent: Jun. 29, 1999

[54] AIRBAG COVER ASSEMBLY WITH INTEGRATED HINGE

[75] Inventors: Fred Daris, Clarkston; John C. Rust, Rochester Hills; Randall J. Ryszewski, Grosse Pointe Woods, all of Mich.

[73] Assignee: Chrysler Corporation, Auburn Hills, Mich.

[21] Appl. No.: 08/984,551

[22] Filed: Dec. 3, 1997

[51] Int. Cl.⁶ .................................................... B60R 21/16
[52] U.S. Cl. ...................................... 280/728.3; 280/732
[58] Field of Search ........................... 280/728.2, 728.3, 280/731, 732

[56] References Cited

U.S. PATENT DOCUMENTS

| | | | |
|---|---|---|---|
| 3,708,179 | 1/1973 | Hulten | 280/732 |
| 4,893,833 | 1/1990 | DiSalvo et al. | 280/732 |
| 5,066,037 | 11/1991 | Castrigno et al. | 280/732 |
| 5,275,432 | 1/1994 | Pray et al. | 280/728 |
| 5,303,951 | 4/1994 | Goestenkors et al. | 280/728 |
| 5,316,333 | 5/1994 | Kokeguchi | 280/728 |
| 5,342,090 | 8/1994 | Bobchak et al. | 280/732 |
| 5,348,339 | 9/1994 | Turner | 280/728 |
| 5,411,288 | 5/1995 | Steffens, Jr. | 280/728.3 |
| 5,431,433 | 7/1995 | Steinke et al. | 280/728.3 |
| 5,445,409 | 8/1995 | Abramczyk et al. | 280/782.2 |
| 5,490,689 | 2/1996 | Garner et al. | 280/728.2 |
| 5,520,410 | 5/1996 | Sun | 280/728.3 |
| 5,527,065 | 6/1996 | Saberan et al. | 280/728.3 |
| 5,538,277 | 7/1996 | Frary et al. | 280/728.2 |
| 5,641,178 | 6/1997 | Lee | 280/728.3 |
| 5,687,989 | 11/1997 | Maesing et al. | 280/728.2 |
| 5,722,684 | 3/1998 | Saderholm et al. | 280/728.3 |

FOREIGN PATENT DOCUMENTS 24 25 659  12/1975  Germany ............................ 280/732

*Primary Examiner*—Paul N. Dickson
*Attorney, Agent, or Firm*—Lawrence J. Shurupoff

[57] ABSTRACT

An airbag cover assembly comprises a molded plastic airbag door hinged to a molded plastic instrument panel to cover an airbag opening in the instrument panel. At least one hinge member is integrally molded on a portion of the door. At least one hinge member is integrally molded on a portion of the instrument panel. The hinge members are shaped to define aligned channels. A hinge pin extends through the aligned panels to pivotally mount the door.

8 Claims, 3 Drawing Sheets

AIRBAG COVER ASSEMBLY WITH INTEGRATED HINGE

FIELD OF INVENTION

This invention relates generally to a cover assembly for an airbag and more particularly to a passenger airbag door with an integrated hinge.

BACKGROUND OF THE INVENTION

Typically, the passenger airbag in an automotive vehicle has been covered by an insert molded steel hinge door. While generally satisfactory, manufacturing and installation costs have been excessive.

SUMMARY OF THE INVENTION

The airbag cover assembly of this invention allows for the use of simple molding tools and lower tooling and assembly costs. The instrument panel and door are made of plastic material and may be molded in separate operations, or they may be molded in a single operation to reduce tooling and eliminate the added cost of operations needed to install the door. A reinforcing rod serves as a hinge pin for the door.

Preferably, one or more hinge members are molded on a portion of the airbag door and one or more hinge members are molded on a portion of the instrument panel. These hinge members form aligned channels through which the hinge pin extends.

One of the hinge members may be molded to provide at least one front recess closed at the rear by a rear tab, with at least one rear recess adjacent to the front recess which is closed at the front by a front rib. The recesses, tabs and ribs define a first channel for the hinge pin. The other hinge member may be molded in a generally similar manner to produce recesses, tabs and ribs to form a second channel aligned with the first channel. The configuration of the hinge members is such that they may be formed with the instrument panel and door as part of the overall molding operation.

The hinge is designed to reinforce itself and trap the steel reinforcement rod which allows for the pivot of the door. It is formed in one operation by having matching indentations from the upper and lower halves of the tool mold.

One object of this invention is to provide an airbag cover assembly for the passenger airbag which has the foregoing features and capabilities.

Another object is to provide an airbag cover assembly which is relatively easy to manufacture and assemble.

Other objects, features and advantages of the invention will become more apparent as the following description proceeds, especially when considered with the accompanying drawings.

DETAILED DESCRIPTION OF THE PREFERRED EMBODIMENT

Figure 1:
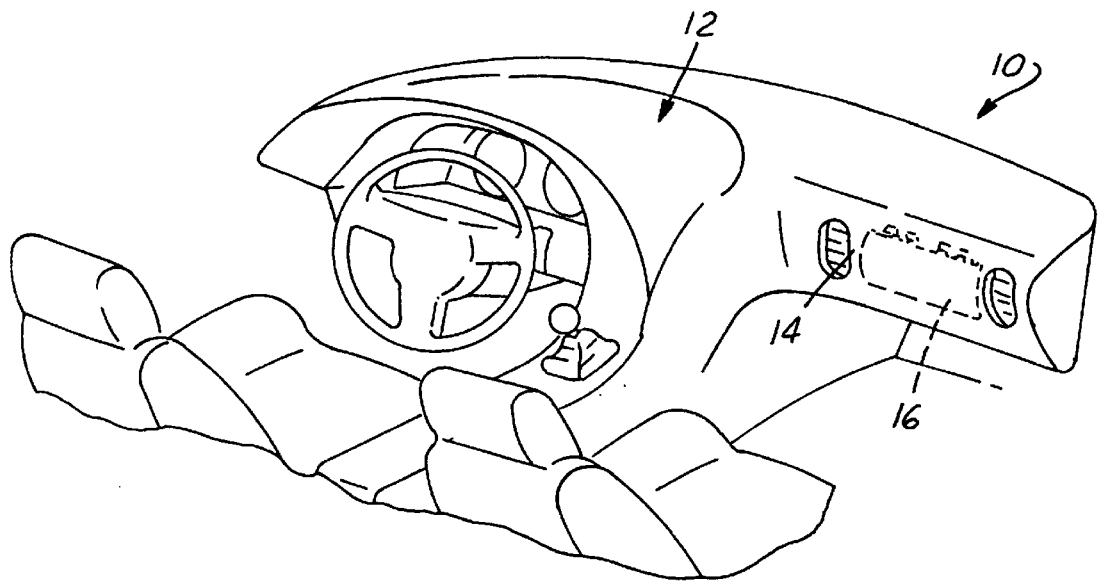
FIG. 1 is a perspective view of an automotive instrument panel with a hinged door for covering the passenger airbag.

Referring now more particularly to the drawings, the instrument panel assembly 10 of this invention comprises an elongated instrument panel 12 having a wall 14 provided with a cover in the form of a door 16 for closing an opening 18 in the instrument panel. The door conceals a stored airbag mounted in front of the opening. In a frontal impact, the airbag forces the door open and deploys through the opening.

Figure 2:
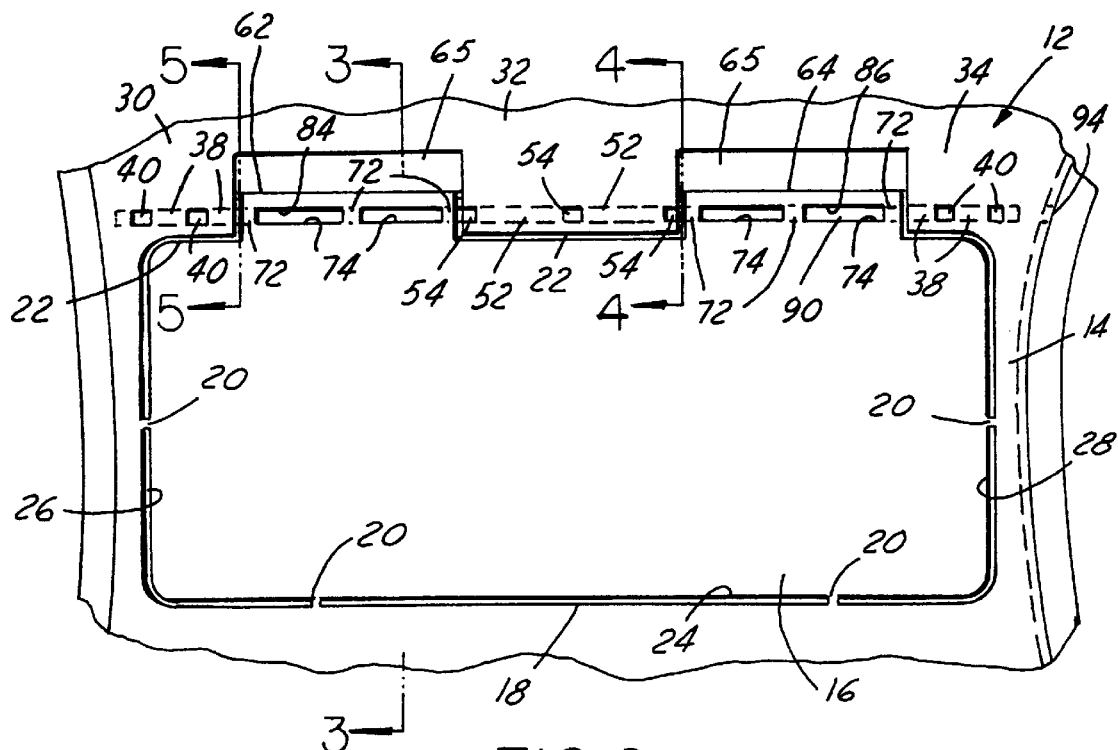
FIG. 2 is a fragmentary elevation showing the hinge connection between the instrument panel and door, as seen from the rear.
Figure 3:
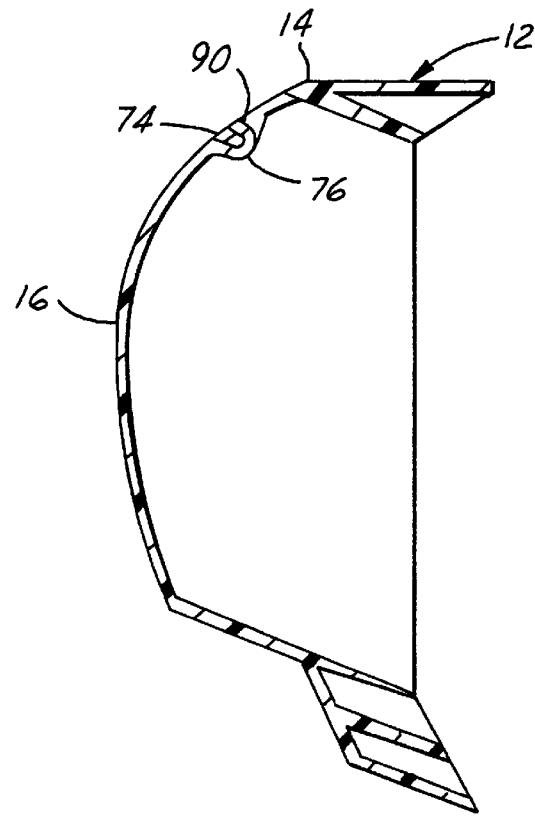
FIG. 3 is a sectional view taken on the line 3—3 in FIG. 2.

The instrument panel 12 preferably is made of a self-supporting, somewhat flexible, thermoplastic material such, for example, as a mixture of acrylonitrile-butadiene-styrene (ABS) and polycarbonate. The door is preferably made of the same plastic material as the instrument panel and may be molded as a unit with the instrument panel with bridging plastic material integrally connecting the instrument panel and door at the points 20 indicated in FIG. 2. This bridging material will fracture easily when the airbag deploys. Alternatively, the door and instrument panel may be molded separately. A decorative layer of vinyl or the like may cover the instrument panel and door, so that the door in FIG. 1 is shown in broken lines.

The opening 18 in the instrument panel is seen as generally rectangular having the vertically spaced top and bottom edges 22 and 24 and the laterally spaced side edges 26 and 28. The door 16 is similarly shaped to fit in the opening.

Integrally and homogeneously molded to the top edge 22 of the opening 18 in the instrument panel are laterally spaced hinge formations or members 30, 32 and 34.

The endmost hinge members 30 and 34 each have laterally spaced front recesses 36 closed at the rear by integral rear tabs 38. Between the front recesses and the outer side of the outermost front recess are rear recesses 40 closed at the front by integral front ribs 42. The recesses, tabs and ribs of the hinge member 30 define a transverse channel 44, and the recesses, tabs and ribs of the hinge member 34 define a transverse channel 46.

The middle hinge member 32 has laterally spaced front recesses 50 closed at the rear by integral rear tabs 52. Between the front recesses and at both ends thereof are rear recesses 54 closed at the front by integral front ribs 56. The recesses, tabs and ribs 50–56 of the hinge member 32 define a transverse channel 60.

The channels 44, 46 and 60 are aligned with one another.

Integrally and homogeneously molded to the upper edge portion of the door 16 are a pair of laterally spaced hinge formations or members 62 and 64. The top edge 22 of the opening 18 in the instrument panel is cut back at 65 to clear the hinge members 62 and 64. Each of the hinge members 62 and 64 has laterally spaced front recesses 66, 68 and 70 closed at the rear by integral rear ribs 72. Between the recesses 66 and 68 and between the recesses 68 and 70 are rear recesses 74 which are closed at the front by integral, arcuate front tabs 76. The recesses, tabs and ribs in the hinge member 62 define a channel 84, and the recesses, tabs and ribs in the hinge member 64 define a channel 86. The channels 84 and 86 are aligned with one another.

When the door 16 is inserted in the opening 18 of the instrument panel, the channels 84 and 86 of the door hinge members 62 and 64 align with the channels 44, 46 and 60 of the instrument panel hinge members 30, 32 and 34. An elongated steel reinforcing rod is inserted into the aligned channels and serves as a hinge pin 90 for the door. The instrument panel is molded with holes 92 and 94 at the opposite ends of the aligned channels to enable the hinge pin to be inserted endwise. The hinge pin 90 is preferably secured to the instrument panel by any means such as a suitable adhesive.

The instrument panel 12 and door 16, including their integral hinge members, may be molded together in a single operation or separately, and, together with the hinge pin, provide a cover assembly for the passenger airbag.

Figure 4:
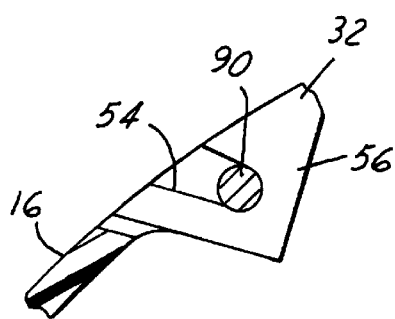
FIG. 4 is a sectional view taken on the line 4—4 in FIG. 2.
Figure 5:
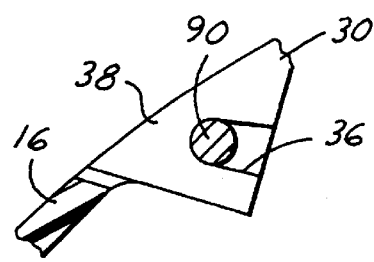
FIG. 5 is a sectional view taken on the line 5—5 in FIG. 2.
Figure 6:
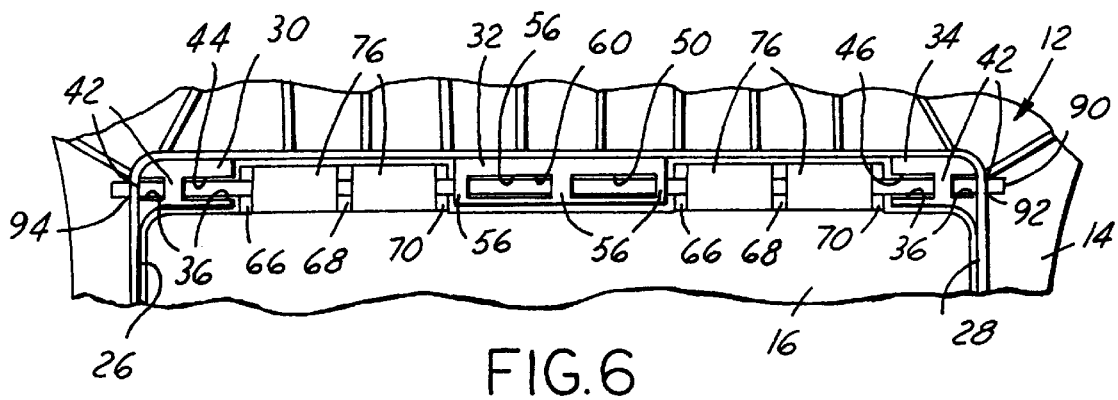
FIG. 6 is a fragmentary elevation showing the hinge connection between the door and the instrument panel, as seen from the front.
Figure 7:
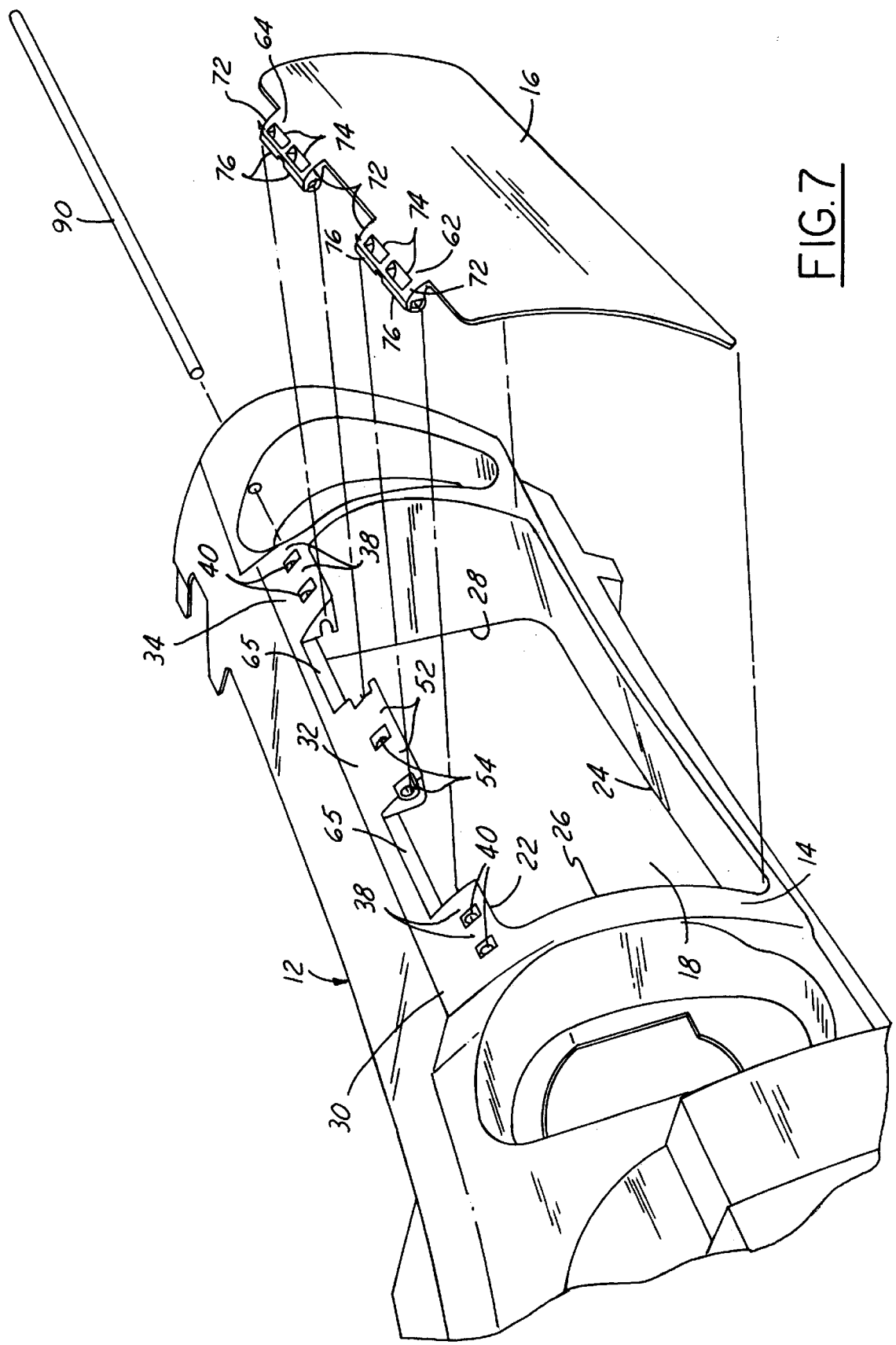
FIG. 7 is an exploded view showing the instrument panel, door and hinge pin separated from one another.

The alternate front and rear recesses of each hinge member are generally C-shaped as best shown in FIGS. 4 and 5 and juxtaposed side-by-side, with the side of each recess opening laterally into the side of an adjacent recess or recesses, to cooperate in defining an open-ended passage forming the channel therein.

What is claimed is:

1. An airbag cover assembly, comprising:

a molded plastic instrument panel;

a molded plastic airbag door;

a first hinge member integrally and homogeneously molded on a portion of said airbag door;

a second hinge member integrally and homogeneously molded on a portion of said instrument panel;

said first and second hinge members being shaped to define aligned channels;

a hinge pin extending through said aligned channels; and wherein said first hinge member has at least one first front recess closed at the rear by a first rear tab, and also has adjacent to said first front recess at least one first rear recess closed at the front by a first front rib, said first recess, rib and tab defining a first channel for the hinge pin, said second hinge member having at least one second rear recess closed at the front by a second front tab, and also having adjacent to said second rear recess at least one second front recess closed at the rear by a second rear rib, said second recess, rib and tab defining a second channel for the hinge pin, said channels being aligned, and said hinge pin extending through said aligned channels.

2. The panel assembly of claim 1, wherein said panel and said door are molded together as an integral structure.

3. An airbag cover assembly, comprising:

a molded plastic panel having an aperture formed therein, said aperture defined by a top edge, spaced-apart side edges and a bottom edge, a molded plastic airbag door mounted within said aperture, said door having an upper edge portion, spaced-apart side edge portions and a bottom edge portion, a hinge assembly pivotably mounting said door within said aperture, said hinge assembly comprising a plurality of spaced-apart panel hinge members molded to said panel along the top edge thereof, a plurality of door hinge members arranged between said panel hinge members and molded to said top edge portion of said door, a pivot pin extending through each of said panel and door hinge members; and wherein each of said panel and door hinge members comprises a plurality of ribs extending transversely of said pivot pin and wherein each of said panel and door hinge members further comprises a plurality of tabs extending transversely of said pivot pin.

4. The assembly of claim 3, wherein said pivot pin is fixed in position on said panel and wherein said hinge door members are arranged to pivot about said fixed pivot pin.

5. The assembly of claim 3, wherein said ribs and tabs define a channel along each hinge member and wherein said pivot pin extends through each said channel.

6. An airbag cover assembly, comprising:

a molded plastic panel having an aperture formed therein, said aperture defined by a top edge, spaced-apart side edges and a bottom edge, a molded plastic airbag door mounted within said aperture, said door having an upper edge portion, spaced-apart side edge portions and a bottom edge portion, a hinge assembly pivotably mounting said door within said aperture, said hinge assembly comprising a plurality of spaced-apart panel hinge members molded to said panel along the top edge thereof, a plurality of door hinge members arranged between said panel hinge members and molded to said top edge portion of said door, a pivot pin extending through each of said panel and dore hinge members, and wherein said panel hinge members each have at least one first front recess closed at the rear by a first rear tab and also have adjacent to said first front recess at least one first rear recess closed at the front by a first front rib, said first recesses, ribs and tabs defining a first channel for the pivot pin, said door hinge members each have at least one second rear recess closed at the front by a second front tab, and also have adjacent to said second rear recess at least one second front recess closed at the rear by a second rear rib, said second recesses, ribs and tabs defining a second channel for the pivot pin, said channels being aligned, and the pivot pin extending through said aligned channels.

7. The assembly of claim 6, wherein the recesses in each of said hinge members are juxtaposed side-by-side with the side of each recess opening laterally into the side of an adjacent recess to cooperate in defining an open-ended passage forming the channel therein.

8. The panel assembly of claim 7, wherein said panel and said cover are molded together as an integral structure.

* * * * *